March 17, 1970     W. A. WAARA     3,501,180
COUPLING TO PROVIDE ANGULAR AND LATERAL ORIENTATION
Filed Sept. 16, 1968
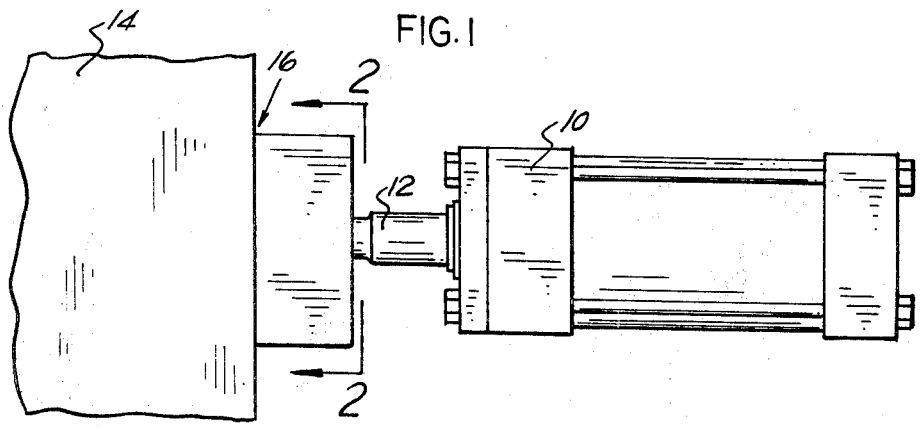
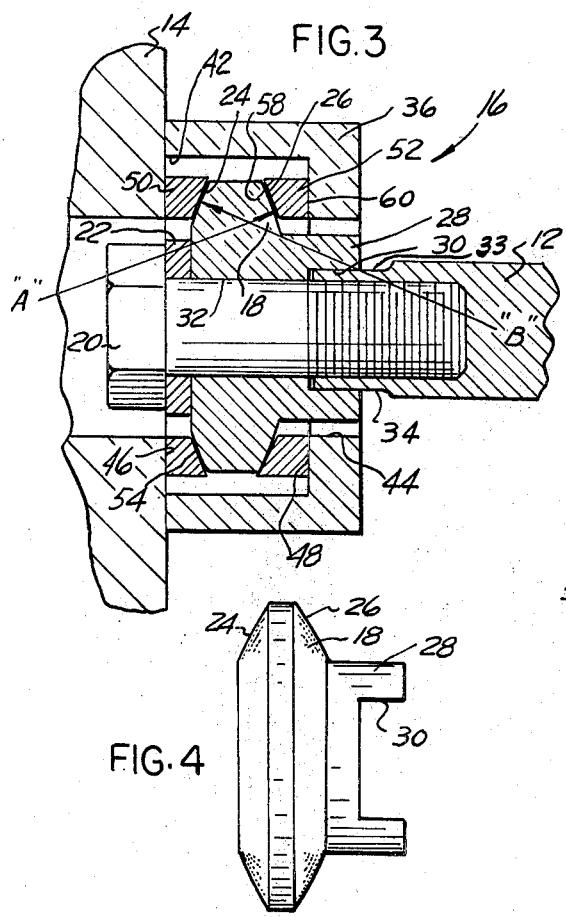
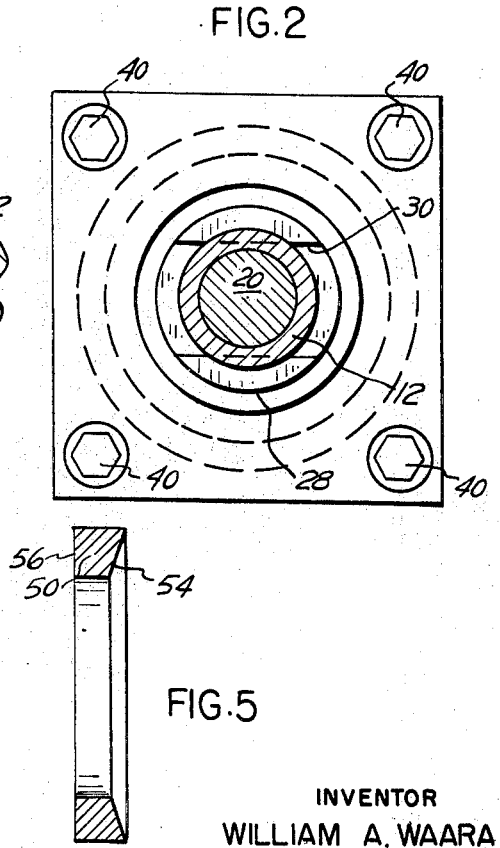
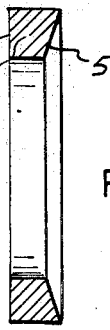
INVENTOR
WILLIAM A. WAARA
ATTORNEYS

United States Patent Office 3,501,180
Patented Mar. 17, 1970

1

3,501,180
COUPLING TO PROVIDE ANGULAR AND LATERAL ORIENTATION
William A. Waara, Detroit, Mich., assignor to Visi Trol Engineering Company, Detroit, Mich., a corporation of Michigan
Filed Sept. 16, 1968, Ser. No. 759,860
Int. Cl. F16c *11/00;* F16b *27/00;* B25g *3/38*
U.S. Cl. 287—21                                      1 Claim

ABSTRACT OF THE DISCLOSURE

A coupling for connecting the rod of an air or hydraulic cylinder to a driven member which is to be reciprocated along an axis that is laterally as well as angularly misaligned with respect to the axis of motion of the rod comprises spherically convex bearing surfaces which mate with floating conical surfaces.

BACKGROUND OF THE INVENTION

This invention relates to coupling devices for connecting the rod of a fluid actuator to a driven member that is to be alternately driven in opposite directions and more specifically to a coupling in which a coupling element is carried on the end of the rod and has spherically convex bearing surfaces which mate with conical surfaces on seats which cooperate to provide a floating socket for the coupling element in a housing that is attached to the driven member.

Ball and socket couplings are normally employed to connect the rod end of a fluid cylinder actuator to a driven member to compensate for angular misalignment between the driven member and the rod. One problem with this type of coupling is that it does not compensate for lateral or side loads acting on the driven member which cause the driven member to move along an axis that is laterally displaced with respect to the axis of the rod. When such a lateral misalignment occurs, the life of the internal cylinder components are reduced because of excessive wear.

In order to compensate for such lateral misalignment, one type of coupling device is commercially available in which the "ball" that is connected on the end of the rod has a spherical surface on one end which mates with a spherical surface seat on the driven member as the rod is extended and an annular shoulder that engages a planar surface as the rod is retracted. This arrangement allows the ball of the rod to laterally "float" with respect to the driven member to accommodate a limited degree of lateral misalignment. There are several disadvantages associated with this arrangement. Because the spherical surfaces are only on one side of the ball, it cannot uniformly compensate for angular misalignment in both directions of motion of the rod. Secondly, the large area of surface contact between the ball and the seat provides a substantial frictional resistance as the rod and the driven member are moved with respect to one another.

SUMMARY OF THE INVENTION

The preferred embodiment of the present invention comprises a generally flat coupling element or "ball" that is mounted on the end of the rod of a fluid cylinder and is formed with a pair of annular bearing surfaces which are supported about the longitudinal axis of the rod. One of the bearing surfaces faces toward the cylinder and the other faces away from the cylinder. Each bearing surface is spherically convex with a center of curvature that lies beyond the other bearing surface and outside the mass of the coupling element. The coupling element is seated in a floating socket formed of a pair of annular

2 seats which are housed in a cap fixed to the driven member. The two seats, one on each side of the coupling element, have conical surfaces engaged with the spherical surfaces of the coupling element. Each seat is slidably movable with respect to the cap in a lateral direction with respect to the direction in which the driven member is being moved.

The floating socket allows the coupling to compensate for angular misalignment whether the rod is pushing or pulling the driven member because curved surfaces are mated in both directions of the rod's motion. In addition, the socket accommodates lateral misalignment between the directions of motion of the rod and the driven member because the seats are laterally movable with respect to their housing.

By providing spherical surfaces on the coupling element which mate with conical surfaces on the bearing seats, each spherical surface contacts its respective conical surface along the line so that there is little frictional resistance with respect to motion of the coupling element with respect to its seats as opposed to couplings that have a surface contact. The line contact of the preferred embodiment also provides a self-cleaning feature so that little or no lubricant is necessary in the coupling.

The preferred embodiment can be employed with standard, commercial fluid cylinders, both air and hydraulic. Although described with reference to a rod having a female end, the invention could be embodied in a coupling for a rod having a male end.

Still other advantages of the present invention will readily become apparent to those skilled in the art to which the invention pertains upon reference to the following detailed description.

DESCRIPTION OF THE DRAWING

The description refers to the accompanying drawing in which like reference characters refer to like parts throughout the several views in which:

FIGURE 1 is a view showing a fluid cylinder having a rod connected to a driven member by a coupling illustrating the preferred embodiment of the present invention;

FIGURE 2 is an enlarged view of the preferred coupling as seen along lines 2—2 of FIGURE 1;

FIGURE 3 is a longitudinal sectional view through the preferred coupling;

FIGURE 4 is a view of the coupling element separated from the end of the rod; and FIGURE 5 is a view of one of the bearing seats separated from the housing.

DESCRIPTION OF THE PREFERRED EMBODIMENT

Now referring to the drawing, FIGURE 1 illustrates a fluid actuating cylinder, generally indicated at 10, having a rod 12 which is extended and retracted from the actuator as a fluid medium under pressure, such as compressed air, oil under pressure, or the like, is alternately introduced to opposite sides of a piston (not shown). The rod 12 is connected to a driven member 14 that is moved in forward and reverse directions by a coupling generally indicated at 16. The coupling device 16 provides for lateral as well as angular misalignment between the axis of motion of the rod 12 and the axis of motion of the driven member 14.

The coupling device 16 includes a metal coupling element 18 fixedly mounted on the end of the rod 12 by a bolt 20 and a lock washer 22. The coupling element 18 is formed with a pair of annular bearing surfaces 24 and 26 which are symmetrical about the axis of the coupling element. The coupling element 18 is mounted on the rod 12 so that the bearing surfaces 24 and 26 face in opposite directions with respect to the longitudinal axis of the rod 12 which corresponds to the axis of motion of the rod 12 as it is extended and retracted.

The two bearing surfaces 24 and 26 are spaced from one another with respect to the axis of motion of the rod 12 and each is formed about centers of curvature at B and A respectively, which are spaced from one another, are on the axis of motion of the rod 12 and are substantially outside of the mass of the coupling element 18 between the two bearing surfaces. As can be seen in FIGURE 3, the center of curvature A of the spherical surface 26 lies beyond the surface 24 and similarly the center of curvature B of the spherical surface 24 lies beyond the spherical surface 26 so that the coupling element 18 has a somewhat flat, compact configuration as compared to the size of a ball having curved surfaces with a similar radius. For example, in the preferred embodiment, the surfaces 24 and 26 are formed about centers having a radius of curvature of about 1⅞ inches whereas the overall diameter of the coupling element is only about 2⅛ inches and its overall thickness between the bearing surfaces is only about $^{41}/_{64}$ inch.

A boss 28 on the coupling element extends toward the rod 12 and is formed with a transverse slot 30 having opposed sides on opposite sides of an axial bore 32 that extends through the coupling. The rod 12 has a pair of conventional flats 33 and 34 formed adjacent its end. When the coupling element 18 is joined to the end of the rod 12, the flats 33 and 34 mate with the sides of the slot 30 so that the coupling element cannot rotate with respect to the rod 12 and the end of the rod 12 bottoms against the base of the slot 30 so that the bolt 20 rigidly secures the coupling element 18 to the rod 12.

The coupling device 16 further comprises a cap or housing 36 that is fixedly attached to the driven member 14 by four threaded fasteners 40 and cooperates with the driven member to form an internal cavity 42 for enclosing the coupling element 18. The housing 36 has an opening 44 through which the end of the rod 12 extends. The cavity 42 has a pair of spaced, opposed, parallel, planar walls 46 and 48 which form a pair of bearing surfaces that are transverse to the axis of motion of the driven member 14.

A pair of similarly shaped, annular bearing seats 50 and 52 are slidably disposed in the cavity 42. Referring to FIGURE 5, the bearing seat 50 has one face forming a frusto-conical bearing surface 54 which mates with the spherically convex bearing surface 24 of the coupling element 18. The bearing seat 50 also has a planar bearing surface 56 provided on its opposite face which is slidably engaged with the bearing surface 46 of the cavity. Similarly the bearing seat 52 has a frusto-conical bearing surface 58 which mates with the spherically convex bearing surface 26 of the coupling element and a flat bearing surface 60 which is engageable with the bearing surface 48 of the cavity. As best seen in FIGURE 3, the two bearing elements 50 and 52 cooperate to provide a floating socket for the coupling element 18 so that as the rod 12 is extended to push the driven member 14, the spherical surface 24 forms a line contact with a conical surface 54, and similarly when the rod 12 is retracted to pull the driven member 14, the spherical surface 26 forms a line contact with a conical surface 58. This spherical-to-conical seating arrangement allows the rod 12 to move the driven member 14 in its forward and reverse directions even though the member 14 moves along an axis that is angularly misaligned, or non-parallel with respect to the axis of motion of rod 12. Because both of the bearing seats 50 and 52 can move laterally in the cavity on the surfaces 46 and 48, the coupling accommodates lateral misalignment between the axis of motion of the driven member 14 and the rod 12. In addition to providing for both angular and lateral misalignment, the preferred coupling is relatively compact with respect to conventional self-aligning couplings and the spherical-to-conical mating surfaces provide a self-cleaning action so that little or no lubricant is required in the coupling. The preferred coupling device can be readily attached to conventional, commercial fluid actuators either air or hydraulic, can be readily mounted in place and assists in prolonging the life of fluid cylinder actuators where misalignment exists between the actuator and the machine that is being operated.

It is to be understood that although I have described but one embodiment of my invention, various changes and revisions can be made therein without departing from the spirit of the invention as expressed in the scope of the appended claim.

What is claimed is:
1. The combination, comprising:
 (a) a first member supported for motion along an axis in a first direction and in a second, opposite, direction;
 (b) a coupling element fixedly oriented on said first member and provided with a pair of annular, spherically convex bearing surfaces which are formed about a line which coincides with the axis of motion of the said first member, and face in opposite directions with respect to said axis;
 (c) a second member which is movable in opposite directions along an axis;
 (d) housing means fixed on the second member and substantially enclosing the coupling element;
 (e) a pair of spaced, bearing seats disposed in said housing means on opposite sides of the coupling element, each of said bearing seats having a first bearing surface which forms a portion of a core and is engaged with one of the spherically convex bearing surfaces on the coupling element and a second bearing surface which is slidably engaged with the housing for motion in directions which are lateral with respect to the axis of motion of the second member so that one of said members can be moved by the other of said members along their respective axes even though said axes may be misaligned with respect to one another
 (f) said first member comprises an elongated rod having an end and including means removably attaching the coupling element to the end of the rod so that the spherical surfaces face in opposite directions with respect to the longitudinal axis of the rod;
 (g) said coupling element having a boss which extends in the direction of the longitudinal axis of the rod and is formed with a transverse slot in one end thereof which define a pair of diametrically opposed flat sides which embrace and engage a pair of exterior flats on the end of the rod to prevent rotation of the coupling element with respect to the longitudinal axis of the rod, when it is attached to the end of the rod.

References Cited
UNITED STATES PATENTS

| 553,265 | 1/1896 | Scholer | 279—16 |
| 2,096,966 | 10/1937 | Hufferd. | |
| 2,431,476 | 11/1947 | Hall | 279—16 |
| 2,730,960 | 11/1956 | Krause | 287—21 XR |
| 3,406,992 | 10/1968 | Grotness | 287—87 XR |
| 3,269,758 | 8/1966 | Ulderup et al. | 287—87 |

DAVID J. WILLIAMOWSKY, Primary Examiner

ANDREW V. KUNDRAT, Assistant Examiner

U.S. Cl. X.R.

287—87

VEC-111-A

PO-1050
(5/69)

UNITED STATES PATENT OFFICE
CERTIFICATE OF CORRECTION

Patent No. 3,501,180          Dated March 17, 1970

Inventor(s) WILLIAM A. WAARA

It is certified that error appears in the above-identified patent and that said Letters Patent are hereby corrected as shown below:

IN THE CLAIMS

Column 4, line 34, change "core" to --cone-- .

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents